United States Patent
Stephens et al.

(10) Patent No.: US 9,919,802 B2
(45) Date of Patent: Mar. 20, 2018

(54) LATERALLY-EXPANDING TRAY TABLE

(71) Applicant: B/E AEROSPACE, INC., Wellington, FL (US)

(72) Inventors: Benjamin D. Stephens, Atlanta, GA (US); Mark A. Kruse, Atlanta, GA (US); Francis X. Garing, Atlanta, GA (US)

( * ) Notice: Subject to any disclaimer, the term of this patent is extended or adjusted under 35 U.S.C. 154(b) by 0 days.

(21) Appl. No.: 15/288,756

(22) Filed: Oct. 7, 2016

(65) Prior Publication Data

US 2017/0021931 A1    Jan. 26, 2017

Related U.S. Application Data

(63) Continuation-in-part of application No. 14/639,436, filed on Mar. 5, 2015, now Pat. No. 9,573,687.

(60) Provisional application No. 61/976,212, filed on Apr. 7, 2014.

(51) Int. Cl.
| | |
|---|---|
| *A47B 83/02* | (2006.01) |
| *B64D 11/06* | (2006.01) |
| *B64D 11/00* | (2006.01) |
| *B60N 3/00* | (2006.01) |

(52) U.S. Cl.
CPC .......... *B64D 11/0638* (2014.12); *B60N 3/004* (2013.01); *B64D 11/00151* (2014.12)

(58) Field of Classification Search
CPC .......... B64D 11/0638; B64D 11/00151; B60N 3/004
USPC ....... 297/135, 146, 160, 161, 162, 163, 170, 297/171, 172, 173, 174 R, 147
See application file for complete search history.

(56) References Cited

U.S. PATENT DOCUMENTS

| | | | | |
|---|---|---|---|---|
| 3,773,381 | A | * 11/1973 | Brennan | .................. A47C 7/70 297/163 X |
| 4,159,071 | A | 6/1979 | Roca | |
| 4,944,552 | A | 7/1990 | Harris | |

(Continued)

FOREIGN PATENT DOCUMENTS

| | | |
|---|---|---|
| DE | 91 07 375.8 | 9/1991 |
| EP | 1 683 719 A1 | 7/2006 |

(Continued)

OTHER PUBLICATIONS

International Search Report carried out by ISA/US for PCT/US2015/18900 dated 12, 2015.

*Primary Examiner* — Rodney B White

(74) *Attorney, Agent, or Firm* — Shumaker, Loop & Kendrick, LLP

(57) ABSTRACT

In a preferred embodiment, an aircraft passenger seat includes a seat back and a laterally-expanding tray table including a telescoping table segment and a main table segment having an interior pocket for receiving the telescoping table segment in a retracted position, where the telescoping table segment is adjacent to the main table segment in a fully extended position to form a contiguous table surface. The seat back may include a mounting region for stowing the laterally-expanding tray table, including a latching mechanism for latching the main table segment in a stowed position. The mounting region may extend across half the width of the seat back. The seat back may include storage region(s) horizontally adjacent to the mounting region, each storage region configured to stow a passenger convenience feature.

19 Claims, 11 Drawing Sheets

(56) References Cited

U.S. PATENT DOCUMENTS

| | | | |
|---|---|---|---|
| 5,092,652 A | 3/1992 | Macaluso | |
| 5,170,720 A | 12/1992 | Scheurer | |
| 5,370,060 A | 12/1994 | Wang | |
| 5,547,247 A | 8/1996 | Dixon | |
| 5,876,092 A | 3/1999 | An | |
| 6,085,666 A | 7/2000 | Anderson et al. | |
| 6,550,861 B1* | 4/2003 | Williamson | B60N 3/004 297/163 X |
| 6,776,452 B2 | 8/2004 | Onishi | |
| 6,860,550 B2 | 3/2005 | Wojcik | |
| 7,073,449 B2* | 7/2006 | Pipkin | A47B 23/00 108/25 |
| 7,281,762 B1 | 10/2007 | Getfield | |
| 7,306,282 B2 | 12/2007 | Salzer | |
| 7,311,354 B2 | 12/2007 | Giasson | |
| 7,506,923 B1* | 3/2009 | Gauss | B60N 3/002 297/149 |
| 7,621,593 B2 | 11/2009 | Dickinson | |
| 8,826,830 B2 | 9/2014 | Pajic | |
| 8,997,660 B2 | 4/2015 | Satterfield | |
| 9,180,805 B2 | 11/2015 | Millan | |
| 9,573,687 B2* | 2/2017 | Stephens | B64D 11/0638 |
| 9,610,879 B2* | 4/2017 | Zheng | B60N 3/004 |
| 2003/0184957 A1* | 10/2003 | Stahl | B60N 3/004 361/679.1 |
| 2003/0230674 A1* | 12/2003 | Weekly | B60N 3/004 244/129.1 |
| 2007/0052263 A1* | 3/2007 | Baumann | B64D 11/06 297/146 |
| 2009/0078169 A1* | 3/2009 | Osborne | A47B 5/006 108/40 |
| 2009/0174234 A1* | 7/2009 | Vignal | B60N 3/002 297/163 |
| 2011/0148156 A1 | 6/2011 | Westerink | |
| 2012/0139303 A1 | 6/2012 | Westerink | |
| 2013/0001987 A1 | 1/2013 | Heredia | |
| 2014/0183910 A1* | 7/2014 | Ulbrich-Gasparevic | B60N 3/004 297/135 |
| 2016/0221677 A1* | 8/2016 | Hance | B64D 11/0638 |
| 2016/0221678 A1* | 8/2016 | Maillaut | B64D 11/0605 |
| 2017/0071375 A1* | 3/2017 | Smith | A47G 11/004 |

FOREIGN PATENT DOCUMENTS

| | | |
|---|---|---|
| JP | 2008-168884 A2 | 7/2008 |
| WO | WO 2011/089558 A1 | 7/2011 |
| WO | WO 2015/002609 A1 | 1/2015 |

* cited by examiner

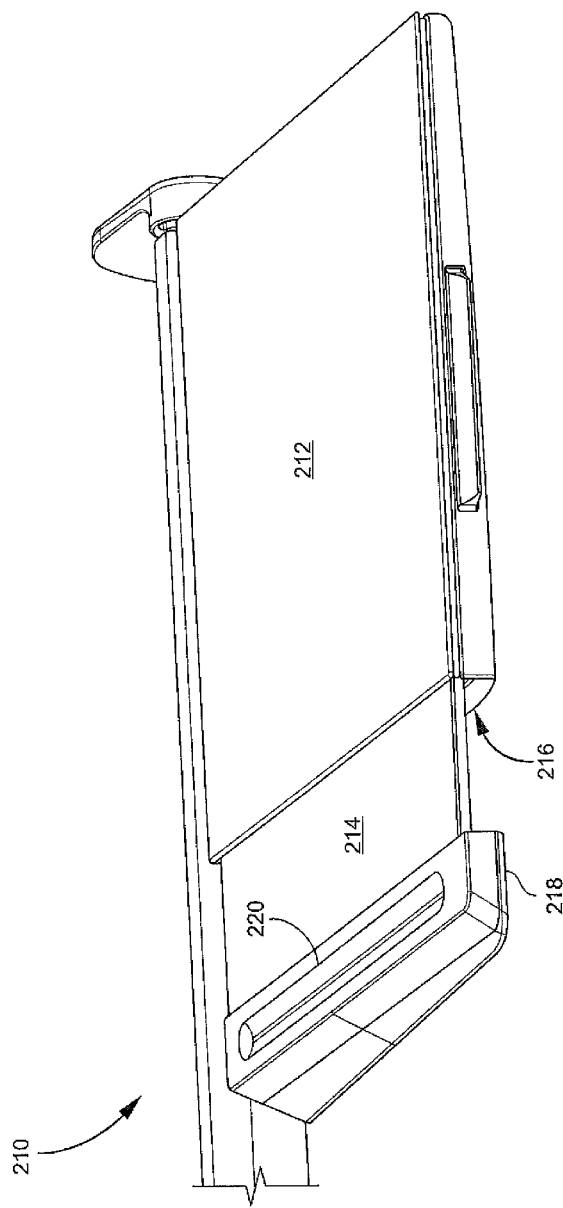

LATERALLY-EXPANDING TRAY TABLE

CROSS REFERENCES TO RELATED APPLICATIONS

This application is a continuation-in-part of and claims priority from U.S. application Ser. No. 14/639,436, entitled "Laterally-Expanding Tray Table" and filed Mar. 5, 2015, which claims priority from U.S. Provisional Application No. 61/976,212 filed Apr. 7, 2014, the contents of both which are incorporated by reference in their entirety.

BACKGROUND

The present disclosure relates to a tray table of the type found on transportation seating products, such as railway and aircraft passenger seats. Conventional tray tables typically extend the width of a seat back, and are moveable between a stowed position flush with and latched to the seat back of a seat and a deployed position with the tray table extending away from the seat back in a generally horizontal position for use by an aft-seated occupant. Other well-known designs include bi-fold tray tables that are hinged in the middle and are typically stowed in a folded configuration in an armrest. To deploy the table, the arm cap is raised, the table pivoted out of a storage cavity in the armrest, pivoted laterally across the lap of the seat occupant, after which the table is unfolded at the hinge to form a full width tray table.

The inventors recognized a need for a tray table that occupies minimal stowage space, affording seat designers to include additional amenities. The inventors further recognized a need for a tray table that, while still useful to a passenger, takes up less space than a standard tray table.

SUMMARY OF ILLUSTRATIVE EMBODIMENTS

In one aspect, the present disclosure relates to tray tables that can increase or decrease in size laterally in order to allow the tray table to reduce in size for stowage, providing increased passenger space and ease of ingress and egress. In some embodiments, laterally expanding tray table designs allow for multiple table sizes depending on how far the moving component is extended. Providing multiple table sizes, for example, may ease ingress and egress when the table is in its reduced-size configuration, while at the same time providing a usable table. In a further example, a laterally-expanding tray table may provide the passenger more leg space when in the reduced size configuration, enabling the occupant to more easily and comfortably assume seating positions such as where the passenger has crossed his or her legs.

In one aspect, the present disclosure relates to tray tables that enable different configurations for other components incorporated into the seat back. For example, the tray table features may enable taller items to be stowed. Items such as personal electronic devices or IFE controllers, for example, can therefore more readily occupy this additional space. In an arm rest deployment example, tray table features described herein may provide additional space for convenience features for the passenger. For example, the aspect ratio of the typical bifold table and the space it occupies when stowed is short and wide, which dictates limitations to the space adjacent to it for items such as connectivity ports, in-flight entertainment ("IFE") remote control devices, and the like.

In one aspect, the present disclosure relates to a laterally-expanding tray table having a first table segment that remains stationary relative to a second, deployable and stowable table segment that moves to increase the size of the table. The tray table may be adaptable, in certain embodiments, to any type of passenger seat, particularly aircraft passenger seats of the type that include a base for attachment to an aircraft cabin deck, a frame mounting a seat bottom and seat back, including seat backs that have recline mechanisms that permit the seat back to move between a full upright taxi, take-off and landing position and a recline position. Such seats, for example, are typically constructed to permit movement of the seat back without moving the tray table carried by the seat.

Therefore, it is therefore an object of the present disclosure to provide a seat back tray table that can increase in size between a stowed position and a deployed use position.

It is another object of the present disclosure to provide a seat back tray table that allows configurations in the areas not occupied by the table when stowed that are not possible with a conventional tray table.

It is another object of the present disclosure to provide a seat back tray table that allows for multiple table sizes depending on how far the movable table segment is extended.

It is another object of the present disclosure to provide a seat back tray table that eases ingress and egress when the table is in a reduced-size configuration, while at the same time providing a usable table.

It is another object of the present disclosure to provide a seat back tray table that gives the passenger more leg space when in the reduced size configuration, for seating positions such as where the passenger has crossed his or her legs.

In one aspect, the present disclosure relates to a seat back tray table that includes an arm assembly attached to a seat having a seat back, and moveable between a stowed position and a deployed, use position. A first table segment may be carried by the arm assembly and moveable with the arm assembly between a stowed position against a stowage area of the seat back and a deployed position aft of the stowage area. A second table segment may be carried by the first table segment and moveable between a stored position within or proximate to the stowage area of the seat back and a deployed position laterally-extended from the first table segment to increase the total surface area of the tray table. A pocket, in some embodiments, is positioned on a bottom side of the first table segment, and the second table segment in its stored position may be telescoped into the pocket in the first table segment and adapted to be translated laterally outwardly from the pocket into the deployed, use position. In some embodiments, a pocket is positioned on a bottom side of the first table segment, and the second table segment is mounted for pivotal movement on a vertical axis and in its stored position is rotated into the pocket in the first table segment and adapted to be rotated laterally on the vertical axis outwardly from the pocket into the deployed, use position.

In some embodiments, a hinge is positioned on a fore and aft-extending side edge of the first table segment, and the second table segment is mounted for pivotal movement of the hinge between a stored position on top of the first table segment and a deployed, use position laterally offset from and in the same horizontal plane as the first table segment.

In some embodiments, the width of the tray table in its fully stowed position is about one-half of the width of the seat back and in its fully deployed position is substantially the entire width of the seat back.

In some embodiments, the second table segment is adapted to be partially deployed whereby the width of the tray table is greater than one-half of the width of the seat back and less than the entire width of the seat back.

In one aspect, the present disclosure relates to an aircraft passenger seat including a seat back and a seat back tray table that includes an arm assembly attached to the seat and moveable between a stowed position and a deployed, use position. A first table segment may be carried by the arm assembly and moveable with the arm assembly between a stowed position against a stowage area of the seat back and a deployed position aft of the stowage area. A second table segment may be carried by the first table segment and moveable between a stored position within or proximate the stowage area of the seat back when the first table segment is in its stowed position, and an extended position laterally-extended from the first table segment to increase the total surface area of the tray table when the first table segment is in its deployed position.

In some embodiments, the width of the tray table in its fully stowed position is about one-half of the width of the seat back and in its fully deployed position is substantially the entire width of the seat back.

In some embodiments, the second table segment is adapted to be partially deployed whereby the width of the tray table is greater than one-half of the width of the seat back and less than the entire width of the seat back.

In some embodiments, the seat back includes passenger convenience devices positioned on about one-half of the width of the seat back not occupied by the tray table in its stowed position. The passenger convenience devices, for example, may include an electronic device connectivity port, an in-flight entertainment ("IFE") remote control device, and/or storage pocket for personal belongings.

BRIEF DESCRIPTION OF THE DRAWINGS

A more complete appreciation of the innovations and many of the attendant advantages thereof will be readily obtained as the same becomes better understood by reference to the following detailed description when considered in connection with the accompanying drawings, where:

FIG. 2B is a perspective view of another example tray table according to an illustrative embodiment as it is being extended laterally from its stowed position into the enlarged, deployed position;

DETAILED DESCRIPTION OF ILLUSTRATIVE EMBODIMENTS

Figure 1A:
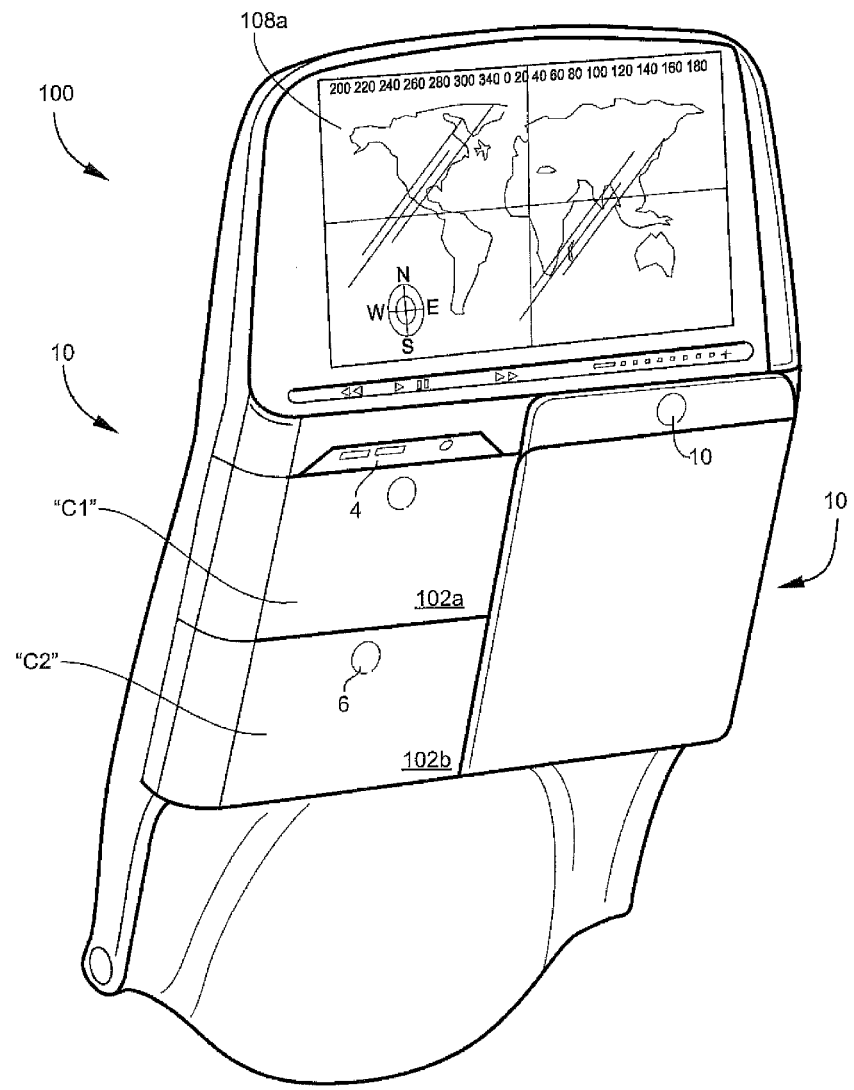
FIGS. 1A and 1B are perspective views of a seat back portion of example aircraft passenger seats showing a telescoping tray table according to illustrative embodiments in its stowed position against the seat back.
Figure 1B:
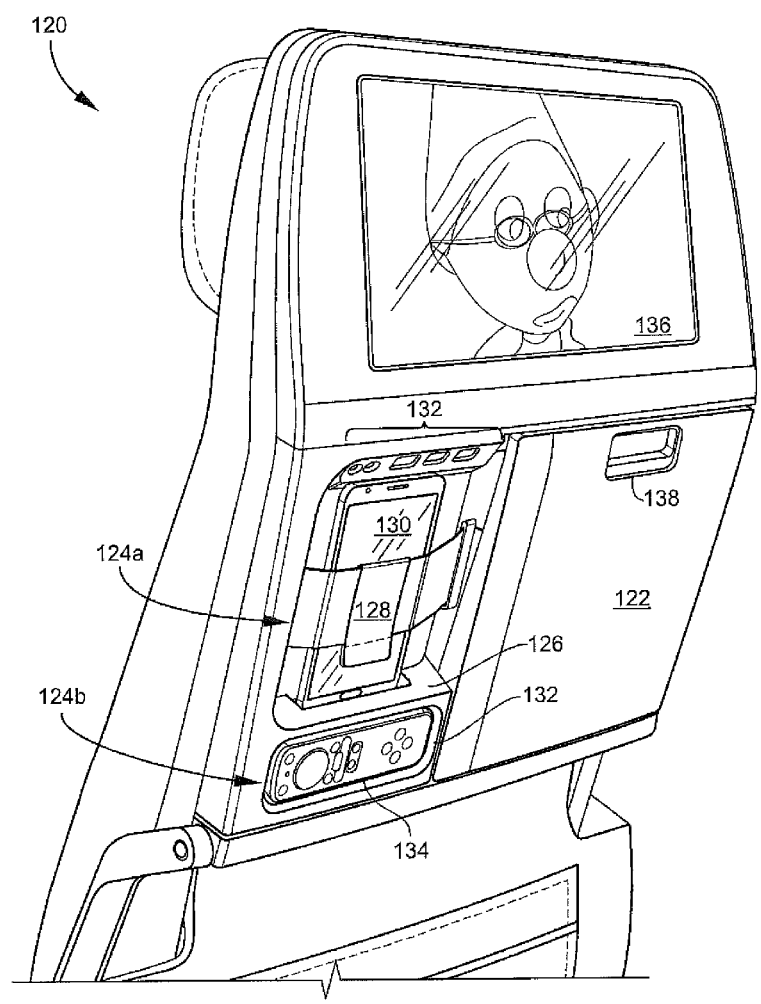

FIGS. 1A and 1B illustrate the advantages of providing a compact, expanding tray table that mounts, in its stowed position, to a seat back of a passenger seat. The additional space freed up by providing the expanding tray table, for example, allows for a number of configurations of additional features mounted on the seat back.

Referring now to FIG. 1A, a seat back 100 is shown of the general type found in main and business cabin areas of commercial aircraft, to which is mounted an expanding tray table 10 according to an illustrative embodiment. As shown, in its stowed position, the expanding tray table 10 occupies one side of the rear of the seat back 100, leaving the other side open. Although the expanding tray table 10 is illustrated on the right side, of the seat back 100, in other implementations, the expanding tray table 10 may be mounted on the left side of the seat back 100.

In some implementations, the region of the seat back 100 proximate to the expanding tray table 10 may contain a number of convenience features, illustrated generally as "C1" and "C2." Convenience features, in some examples, can include data and/or electrical ports, electronic device docking stations, in-flight entertainment ("IFE") remote control devices, audio listening devices such as headphones or ear buds, audio speakers, reading material, flight attendant call button, reading light and/or air vent controls, and/or additional personal storage space.

The convenience features "C1" and "C2", in some embodiments, may be provided within one or more storage regions 102. At least one of the storage regions 102, in some embodiments, includes a flexible pocket. For example, a flexible pocket 102a may provide storage for reading materials such as safety and information pamphlets 104. In some embodiments, at least one of the storage regions 102 includes a hinged storage region 102b (e.g., pocket or door). The hinged storage region 102b, for example, may drop open (e.g., upon actuating a release button 106) to provide access to a convenience feature such as a docking station or personal storage.

As also shown, the seat back 100, in some embodiments, is provided with a video monitor 108a and control bar 108b. The control bar 108b, for example, may include reverse, play, pause/stop, fast forward and volume controls positioned below the video monitor 108a and above the level of the expanding tray table 10.

The tray table 10 may be secured in its stowed position against the seat back 100 with a suitable latching mechanism. In some implementations, the expanding tray table 10 is released from its stowed position against the seat back 100 by actuating a release button 110. For example, depression of the release button 110 may actuate a latch, releasing the tray table from its stowed position.

Turning to FIG. 1B, a seat back 120 is shown to which is mounted an expanding tray table 122 according to an illustrative embodiment. As shown, in its stowed position, the expanding tray table 122 occupies one side of the rear of the seat back 120, leaving the other side open. Although the expanding tray table 120 is illustrated on the right side, of the seat back 120, in other implementations, the expanding tray table 122 may be mounted on the left side of the seat back 120.

In some implementations, the region of the seat back 120 proximate to the expanding tray table 122 may contain a number of convenience features. As illustrated, for example, a first convenience region 124*a* includes a handheld electronic device docking station 126, for example for holding and/or charging a passenger's smart phone, tablet, media player, or gaming system. Above the handheld electronic device docking station 126, a device securement system 128 may provide a securing mechanism to maintain a handheld electronic device 130. For example, as illustrated, the device securement system 128 may be a strap which secures the handheld electronic device 130 in the docking station 126. The strap, for example, may include flexible material such as elastic and/or an adjustable buckle to accept and secure a variety of sizes and shapes of handheld electronic devices. In other embodiments, the device securement system 128 may include one or more tensioner bars, for example to apply spring force against the handheld electronic device 130 to maintain the handheld electronic device 130 within the docking station 126. In further embodiments, the device securement system 128 may include a fabric or plastic pocket to maintain the handheld electronic device 130 within the docking station 126. In a particular example, a clear plastic semi-rigid pocket may provide security for the handheld electronic device 130 while allowing the passenger to view the contents of the screen.

In some implementations, the first convenience region 124*a* includes a series of electronic connectors 132. The connections, in some examples, can include an audio port, a USB port, a micro-USB port, an A/C outlet, and/or a an iPhone® Lightning port.

In addition to or instead of the electronic connectors 132, in some embodiments, the first convenience region 124*a* may include one or more user controls mounted above the docking station 126. The controls, in some examples, can include a lighting control, an air vent control, and/or an attendant call control.

In some implementations, a second convenience region 124*b*, illustrated below the first convenience region 124*a*, includes a mounting mechanism 132 for a remote control device 134. The remote control device 134, in some examples, may snap into the mounting mechanism 132 or mount magnetically to the mounting mechanism 132. In another example, the mounting mechanism 132 and remote control 134 may include mated hook and loop fastener strips, such as Velcro® strips. The remote control 134, for example, may control the output of a video display 136 mounted to a headrest region of the seat back 120. Further, the remote control 134 may control an audio output to a device connected to an audio connector 132.

In some implementations, the expanding tray table 122 includes a handle 138 for releasing the expanding tray table 122 from its stowed position. The handle 138, for example, may include a release mechanism, such as a push bar, to release a corresponding lock mounted to the passenger seat back 120 behind the expanding tray table 122. The handle 138, in other embodiments, may be used by the passenger to apply a force to overcome a frictionally-held stowed position. Locking mechanism options are described in further detail below in relation to FIG. 6D.

Figure 2A:
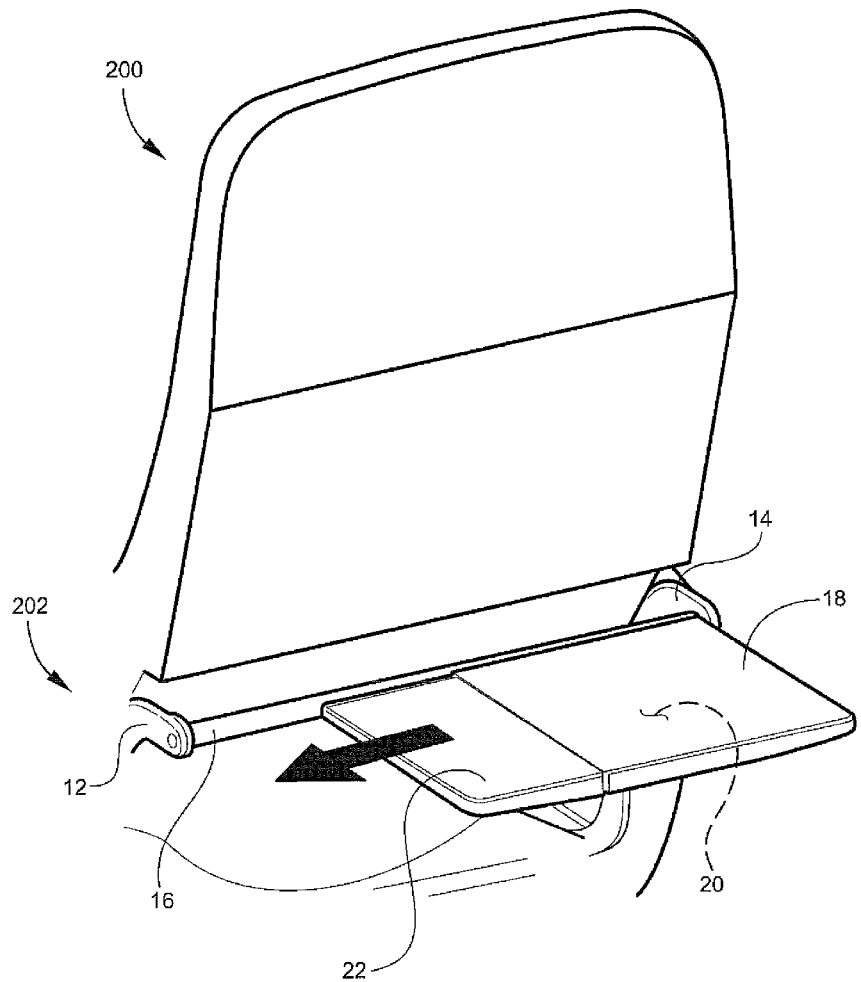
FIG. 2A is a perspective view of the seat back portion of an aircraft passenger seat showing an example tray table according to an illustrative embodiment as it is being extended laterally from its stowed position into the enlarged, deployed position.
Figure 3:
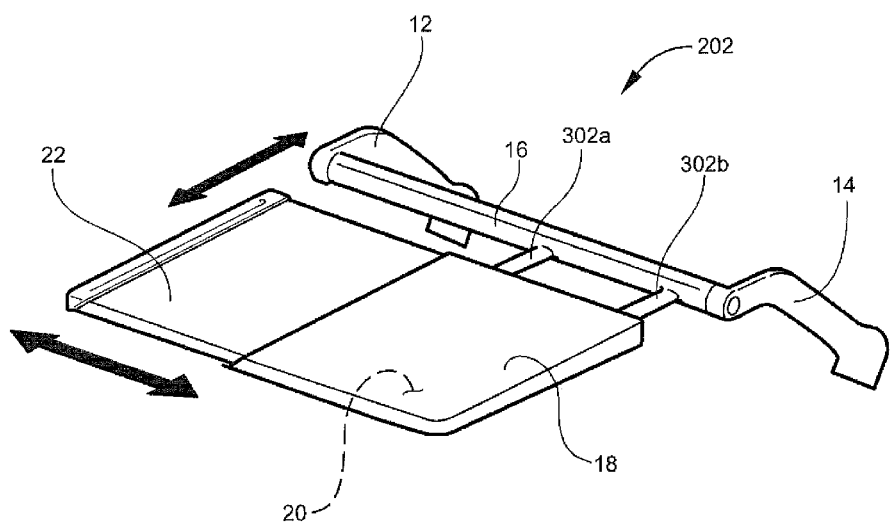
FIG. 3 is a fragmentary perspective view of the telescoping tray table showing lateral and fore and aft movement.

Referring now to FIGS. 2A and 3, in some implementations, an expanding tray table 200 includes an arm assembly with a pair of laterally-opposed arms 12, 14 connected by a pivotally-mounted stabilizing cross bar 16. Tray table segments 18 and 22, for example, may pivot from a horizontal deployed position (as displayed) to a vertical stowed position (e.g., as illustrated in FIGS. 1A and 1B) using the pivotally-mounted stabilizing cross bar 16.

As shown in FIG. 3, the arm assembly may further include one or more table supports 304 (illustrated as a pair of table supports 304*a*, 304*b*) extending from the cross bar 16 and connected to a main table segment 18. The table supports 304, for example, may provide support to the tray table segments 18, 22 in a retracted position, and permit the tray table segments 18, 22 to slide away from a seat back 200 (illustrated in FIG. 2A) towards the seat occupant in an extended position (illustrated in FIG. 3).

The main table segment 18, in some implementations, includes an interior pocket 20 for receiving a telescoping table segment 22. The telescoping table segment 22, for example, may be positioned, using a lateral sliding movement, from a stored position shown in FIG. 1, to a partially-deployed position shown in FIGS. 2A and 2B and further to a deployed, use position illustrated in FIGS. 3 and 6B. The partially-deployed position, shown in FIGS. 2A and 2B, may be extended to a fully-deployed position, for example, by continuing to withdraw the telescoping table segment 22 from the pocket 20 in the main table segment 18 to arrive at the position shown in FIGS. 3 and 6B.

Turning to FIG. 3, in some implementations, the table supports 304 are disposed in an interior region of the main table segment 18 separate from the pocket 20. For example, a dividing mechanism may separate the pocket 20 from the table supports 304 to avoid friction or interference between the telescoping table segment 22 and the table supports 304. In other embodiments, the pocket 20 may encompass the table supports 304, but the telescoping table segment 22 may be separated from interfering with the table supports 304 by guide rails or grooves which maintain position of the telescoping table segment 22 while it is at least partially stowed within the pocket 20. The table supports 304, in some embodiments, are disposed above the stowage region for the telescoping table segment 22. For example, the table supports 304 may be provided in a position that will be closer to the seatback 100, 120 upon stowing (e.g., see FIGS. 1A and 1B). In this configuration, for example, the telescoping table segment 22 may be configured to follow curved rails or grooves when being extended, thus maintaining the telescoping table segment 22 at least partially within the main table segment 18 in part due to gravity. In other embodiments, the table supports 304 are disposed below the stowage region for the telescoping table segment 22. In this manner, the table supports 304 will be further away from the passenger seatback 100, 120 upon stowage, allowing the expanding tray table 110, 122 (see FIGS. 1A and 1B) to nest within a depression in the seat back 10, 120 and align in a significantly flush manner with proximate convenience features. For example, turning to FIG. 6C, a set of guide rails 636 are disposed within a pocket 634 of a main table segment 632 for receiving table supports such as the table supports 304 of FIG. 3. In this example, a telescoping table segment 640, upon stowing, will be disposed above the guide rails 636. Further, a series of struts 642 (e.g., parallel to the guide rails 636) may be introduced to maintain the telescoping table segment 640 in its position above the guide rails 636.

In other embodiments, the table supports are disposed below the main table segment 18. For example, the table supports may be provided on rails mounted to an underside of the main table segment 18. In this configuration, for example, the pocket 20 (and thickness of the main table segment 18) may be allowed to be as narrow as possible, providing a low profile upon mounting in the stowed position against the seat back 100, 120.

To deploy the telescoping table segment, in some embodiments, a user grasps a protruding edge of the telescoping table segment For example, as illustrated in FIG. 2B, the telescoping table segment 22 may include a protruding edge to allow the user to deploy the telescoping table segment 22 from the pocket 20. In some implementations, the protruding edge includes gripping mechanism. The gripping mechanism, in some examples, can include a sticky surface (e.g., rubberized) and/or a textured surface to improve grasping of the protruding edge of the telescoping table segment.

Turning to FIG. 2B, in some implementations, a telescoping table segment 214 of an expanding tray table 210 includes a gripping mechanism 218 with a finger hold region 220 protruding from a pocket 216 of a main table segment 212. The gripping mechanism 218, as illustrated, includes a grooved finger hold region 220. In other examples, the finger hold region may include slim bar extending from the end of the telescoping table segment 214, finger wells positioned on one or both sides of the telescoping table segment 214, or a raised protrusion extending above an upper surface of the edge of the telescoping table segment 214 and/or below a lower surface of the edge of the telescoping table segment 214.

In some implementations the retracted table segments 18, 22 may be retained in a current position of extension or retraction by friction between the telescoping table segment 22 and one or more contacting parts within the pocket 20 of the main table segment 18. For example, in embodiments of the pocket 20 including a curved guide rail, the effect of gravity and the curvature may sandwich the telescoping table segment 22 and frictionally hold the telescoping table segment 22 in a particular depth of extension. In another example, turning to FIG. 6A, a cut-away view of an expanding tray table 600 illustrates a flexible main table segment 602 composed of a semi-rigid material which flexes upwards and/or downwards upon receipt of a telescoping table segment 604 within at least a portion of a pocket 606, frictionally supporting the telescoping table segment 604 against a shelf 610 of material internal to the pocket 606 upon fully expanding the expanding tray table 600, for example, a narrow portion 612 of the telescoping table segment 604 may be sandwiched between an upper surface of the main table segment 602 and the shelf 610 and frictionally engaged therein. Although illustrated with a lower shelf 610, in other embodiments, the shelf 610 may be disposed upon an upper inner surface of the pocket 606.

Figure 6A:
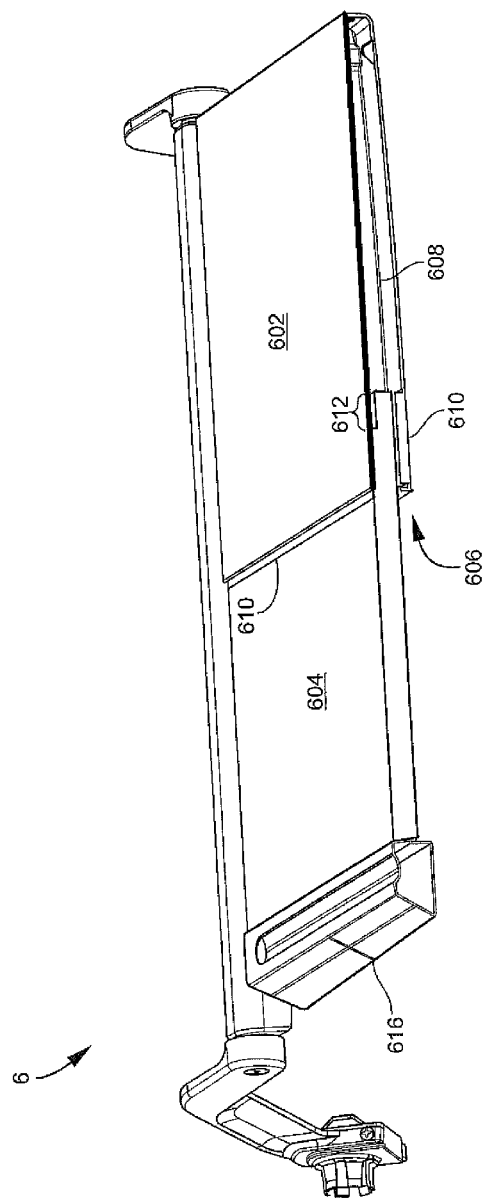
FIG. 6A is a perspective cut-out view of an example tray table according to an illustrative embodiment as it is being extended laterally from its stowed position into the enlarged, deployed position.
Figure 6B:
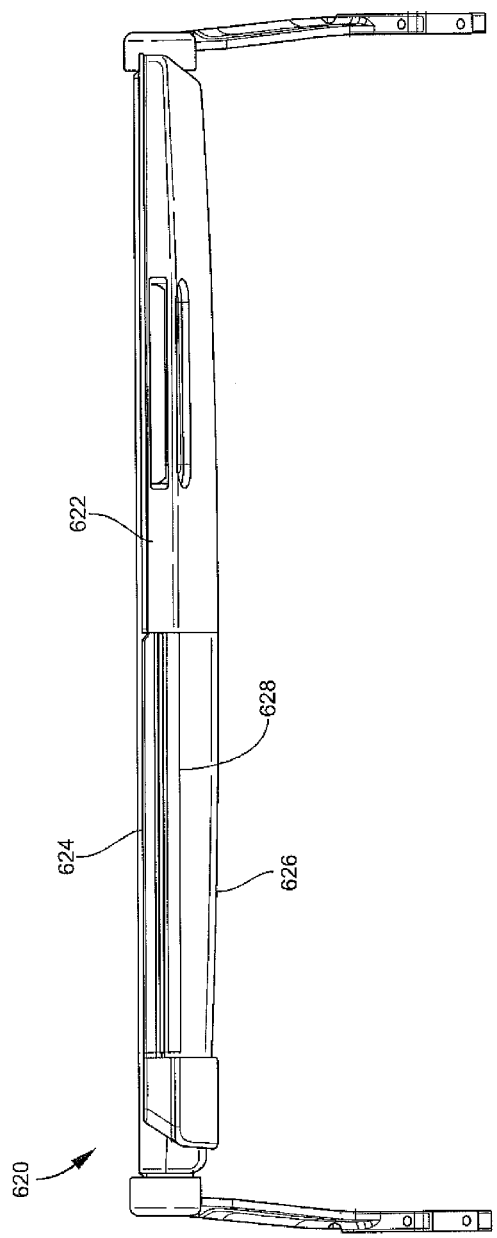
FIG. 6B is a cut-out view of an example tray table according to an illustrative embodiment in its enlarged, deployed position.
Figure 6C:
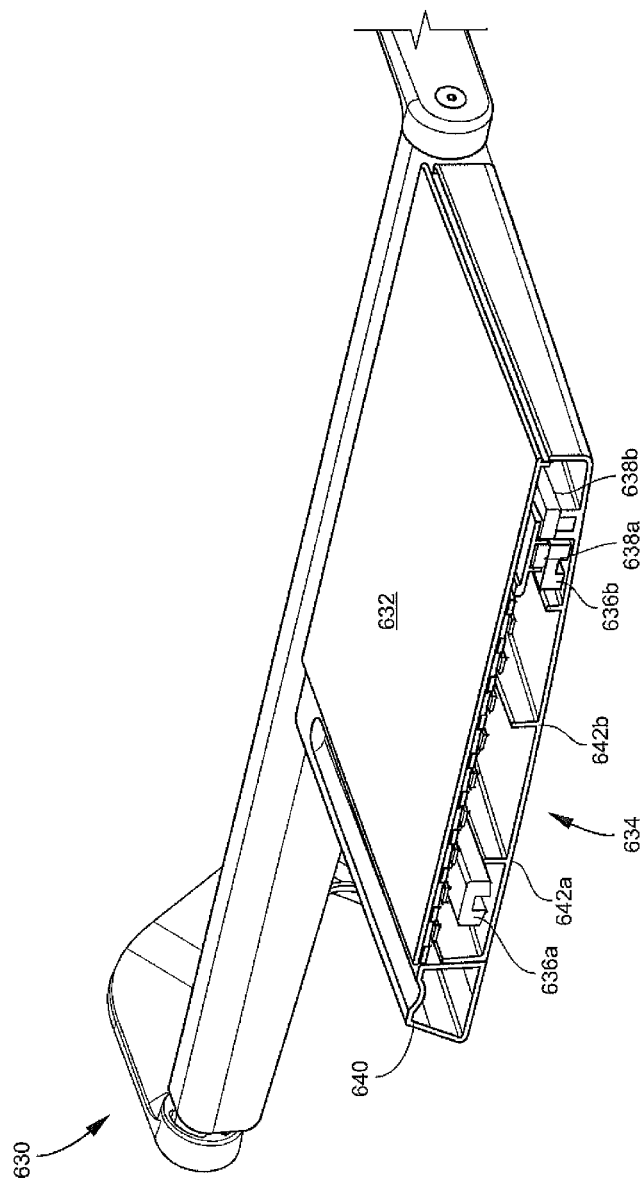
FIG. 6C is a cut-out view of an example tray table according to an illustrative embodiment, showing internal mechanisms for sliding the telescoping portion between its stowed position and its deployed position.

Turning to FIG. 6C, the cutaway view of a tray table illustrates internal retaining mechanisms for encouraging the a main table segment to apply frictional force to maintain the position of the telescoping table segment 640 in relation to the main table segment 632. For example, as illustrated one or more magnets 648 may be disposed within the pocket 634 to maintain the position of the telescoping table segment 640 in relation to the main table segment 632. A first magnet 648*a*, for example, may be disposed upon an edge of the telescoping tray table 640, while a second magnet 638*b* may be disposed within the pocket 634 of the main table segment 632. Alternatively, one magnet 638*b* may be disposed on an upper interior surface of the pocket 634 while another magnet 638*a* is disposed on a lower interior surface of the pocket 634. In this configuration, for example, the passenger may only have to overcome frictional force when deploying the telescoping table segment 640 rather than both frictional force and magnetic force. Although illustrated as being disposed within a far end of the main table segment 632, in other embodiments, one or more magnets 638*b* may be disposed in an end of the main table segment 632 proximate to extension of the telescoping table segment 640.

In other implementations, the internal retaining mechanisms may include one or more extendable guide rails running beneath the telescoping table along its length of extension and connected to a mating retaining mechanism within the pocket 634 of the main table segment 632. Turning to FIG. 6B, for example, an inner edge of the telescoping table segment may include a guide rail mechanism 648 mating with a corresponding guide rail mechanism within the main table segment 622.

As illustrated in FIG. 6B, upon extension, the expanding tray table 620 may present a substantially flat and contiguous surface to the users, where an upper surface of the telescoping table segment 624 aligns with the upper surface of the main table segment 622.

In some implementations, a user may overcome friction force and push the telescoping table segment 604 back into the pocket 610 through pushing on a gripping mechanism 614. While stowing the telescoping table segment 604 in the pocket 606, to avoid contamination of the pocket 606 and potential damage to internal structures (e.g., stickiness or debris within a track 608 followed by the telescoping tray table 604, in some embodiments, the expanding tray table 600 may include a squeegee 618 (e.g., thin flexible edge of the main table segment 602) to push debris away from the pocket 606, as illustrated in FIG. 6A.

Returning to FIG. 2A, in other implementations, the table segments 18, 22 may be secured from lateral translation (e.g., locked) in their deployed position and/or stored position, in some implementations, by a position retention mechanism, such as a latch or a lock. For example, a cam mechanism may be disposed within the main table segment 18 to prevent the telescoping table segment 22, upon deployment, from retracting. Further, the cam mechanism may prevent, upon positioning of the expanding tray table 202 in its deployed position with the telescoping table segment 22 fully stowed, the telescoping table segment 22 from extending outside the pocket 20. The cam mechanism, for example, may require the passenger to overcome a latching force to move the telescoping table segment 22 from a stowed position to a fully extended position and vice-versa.

The table segments of an expanding tray table, such as table segments 18, 22 of FIG. 1, in some implementations, are constructed of lightweight plastic or resin, in other implementations, the table segments are constructed of lightweight metal, such as aluminum. Materials used for the expanding tray tables described herein, in some examples, may be of a type currently used for prior art tray tables and similar commercial airline passenger components.

Figure 6D:
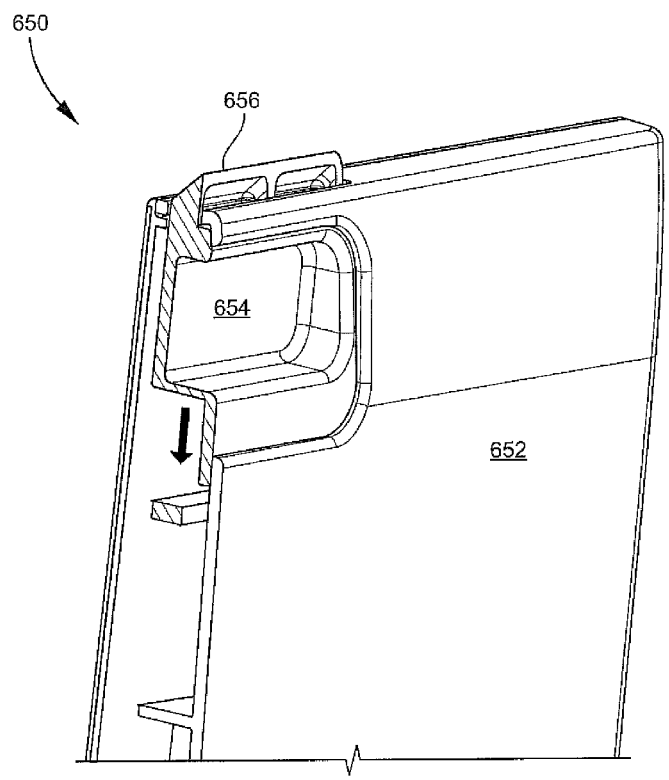
FIG. 6D is a cut-out view of an example tray table according to an illustrative embodiment, showing a portion of the internal mechanisms and an example tray-mounted locking mechanism for locking the tray to a seat back in its stowed position.

Returning to FIGS. 1A and 1B, the expanding tray table 10, 122, in some implementations, may be secured in its stowed position against the seat back 100, 120 using a latching mechanism. The latching mechanism, as illustrated in FIG. 1A, may be actuated using an expanding tray table-mounted button 110. The button, for example, may trigger release of a latching mechanism, deploying the expanding tray table 10. As illustrated in FIG. 1B, the handle 138 may include a release mechanism, such as a push bar, to release a corresponding lock mounted to the passenger seat back 120 behind the expanding tray table 122. Turning to FIG. 6D, in a illustrative example, a handle mechanism 654 mounted to a main table segment 652 of an expanding tray table 650, upon depression in a downward direction in relation to a seatback (not illustrated), releases a latching mechanism 656 mated to a corresponding latching mechanism on the passenger seatback (not illustrated) to release the expanding tray table 650 from its stowed position.

Figure 4:
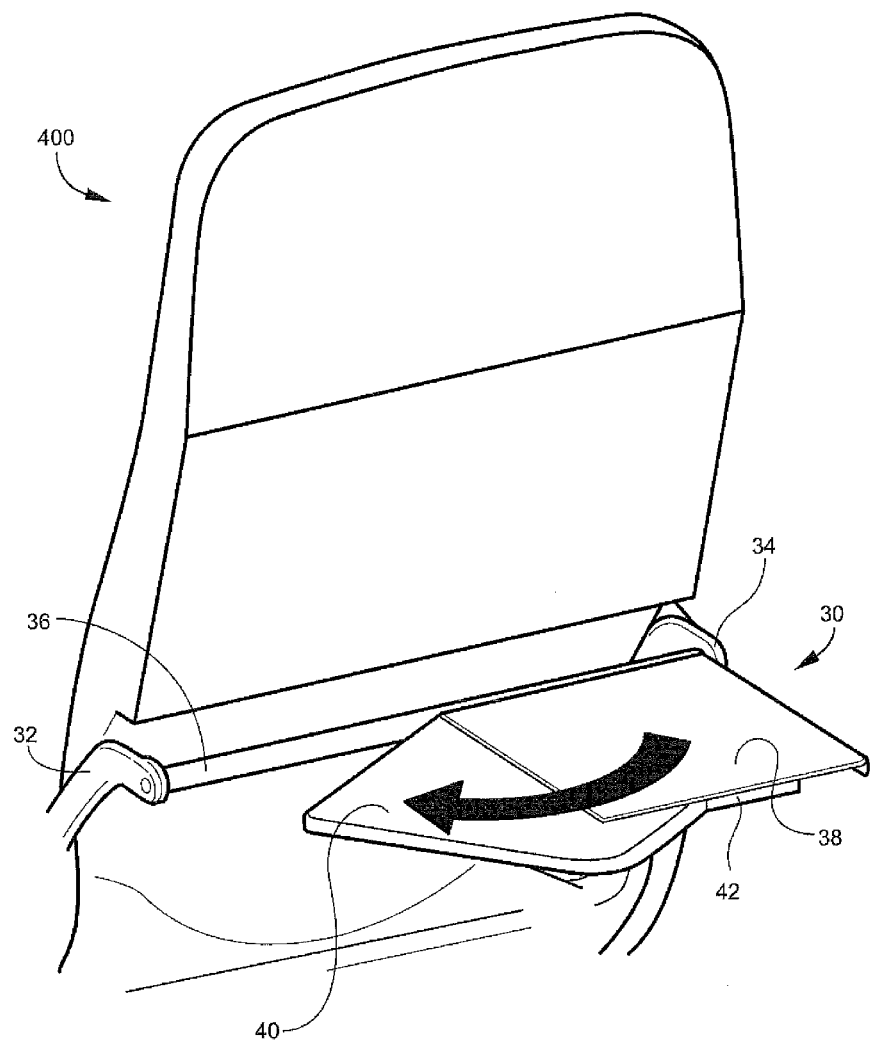
FIG. 4 is a perspective view of the seat back portion of an aircraft passenger seat showing a pivoting tray table according to an illustrative embodiment as it is being extended laterally from its stowed position into the enlarged, deployed position.

Referring to FIG. 4, in some implementations, an expanding tray table 30, shown in a partially deployed position, includes a pair of laterally-opposed arms 32, 34 connected by a stabilizing cross bar 36. A main table segment 38 may be positioned, for example, for pivotal movement on the cross bar 36, as discussed in relation to cross bar 16 in FIG. 3. A pivoting table segment 40, in some embodiments, is positioned for lateral pivoting movement, as shown, between a stored position in a narrow pocket 42 positioned beneath the main table segment 38 and a deployed, use position adjacent to the main table segment 38. In the fully deployed, use position, for example, the pivoting table segment 40 may be in lateral alignment with the main table segment 38. In the fully stored position, the pivoting table segment 40 may be positioned beneath the surface of the main table segment 38 in the pocket 42. The pivoting table segment 40, in some embodiments, pivots around a mounting pin or similar attachment mechanism, not shown, carried by the main table segment 38.

Similar to the discussion above regarding the telescoping table segment, the position of the pivoting table segment may be maintained, in some examples, using frictional and/or magnetic forces.

Figure 5:
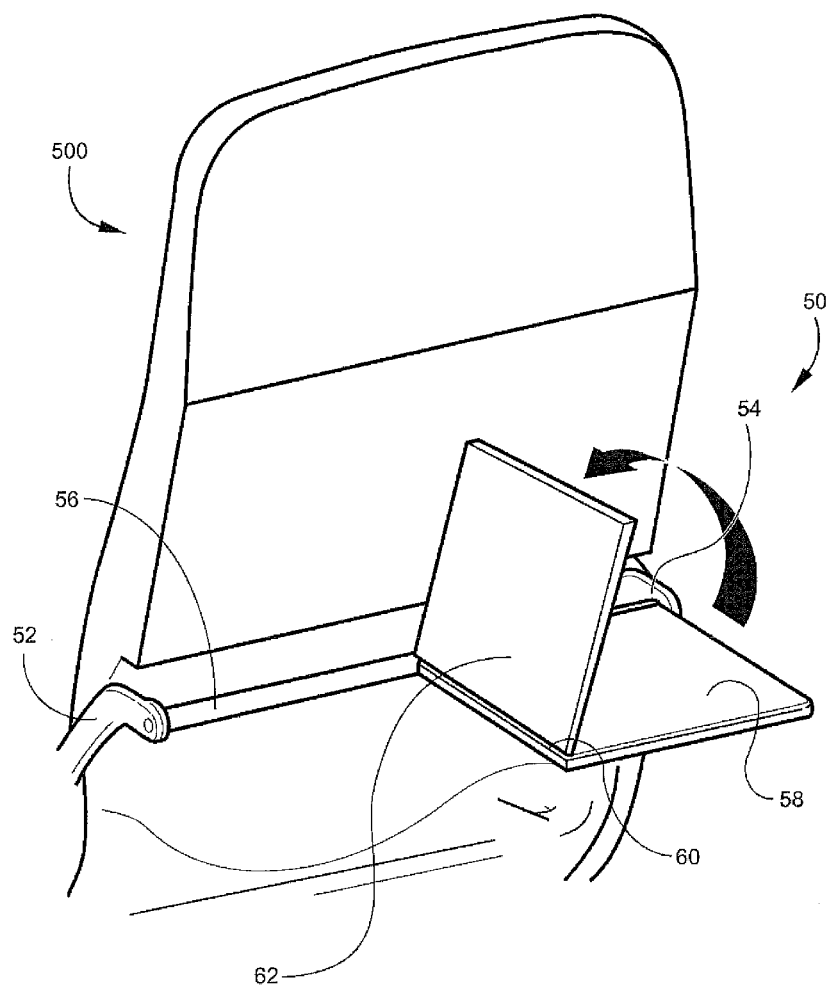
FIG. 5 is a perspective view of the seat back portion of an aircraft passenger seat showing a bi-fold tray table according to an illustrative embodiment as it is being moved to its stowed position from the deployed position.

Referring to FIG. 5, in some implementations, a tray table 50, shown in a partially deployed position, includes a pair of laterally-opposed arms 52, 54 connected by a stabilizing cross bar 56. A main table segment 58 may be positioned for pivotal movement on the cross bar 56, as shown and as illustrated in FIG. 5, and may include a hinge 60 extending fore and aft on the interior side, as shown. A hinged table segment 62 is attached to the hinge 60 for pivoting movement, as shown, in a counter clockwise direction between a stored position and a deployed, use position. In the fully deployed position, as illustrated, the hinged table segment 62 may extend towards the arm 52 in lateral alignment with and in the same horizontal plane as the main table segment 58. In the fully stowed position, the hinged table segment 62 may rest on the top surface of the first table segment 58.

The expanding tray table 50, in some implementations, may be secured in its stowed position against the seat back 500 using a latching mechanism such as latching mechanisms described in relation to expanding tray tables 10, 122 of FIGS. 1A and 1B. In its stowed position, the appearance of tray table 50 may be similar, for example, as the tray table 10 illustrated in FIG. 1A.

The foregoing detailed description of the innovations included herein is not intended to be limited to any specific figure or described embodiment. One of ordinary skill would readily envision numerous modifications and variations of the foregoing examples, and the scope of the present disclosure is intended to encompass all such modifications and variations. Accordingly, the scope of the claims presented is properly measured by the words of the appended claims using their ordinary meanings, consistent with the descriptions and depictions herein.

The invention claimed is:

1. An aircraft passenger seat, comprising:
   a seat back, seat bottom and base adapted for mounting in an aircraft;
   a laterally-expanding tray table mounted on an aft-facing side of the seat back for movement between a stowed position against the seat back and a lowered deployed use position and including a telescoping table segment, and a main table segment having an interior pocket for receiving the telescoping table segment, wherein the telescoping table segment is retained in the interior pocket in a retracted position, and the telescoping table segment is positioned adjacent to the main table segment in a fully extended position to form a contiguous table surface including an upper surface of the telescoping table segment and an upper surface of the main table segment;
   a mounting position for stowing the laterally-expanding tray table, including a latching mechanism for latching the main table segment in a stowed position adjacent the seat back, wherein the mounting region extends approximately one half a width of the seat back; and
   at least one storage bay positioned horizontally adjacent to the mounting position of the seat back for stowing at least one passenger convenience feature.

2. The aircraft passenger seat of claim 1, wherein the laterally-expanding tray table further comprises a pivoting arm assembly for pivoting the laterally-expanding tray table from the stowed position to the deployed position.

3. The aircraft passenger seat of claim 1, wherein the at least one storage bay includes an electronic device docking station.

4. The aircraft passenger seat of claim 1, wherein the at least one storage bay includes at least one port for connecting an electronic device.

5. The aircraft passenger seat of claim 1, wherein the main table segment further comprises a mating portion of the latching mechanism of the mounting position.

6. The aircraft passenger seat of claim 1, wherein the passenger seat further comprises a headrest and a video display mounted on an aft surface of the headrest above the at least one storage bay and the mounting position.

7. The aircraft passenger seat of claim 1, wherein, in the stowedposition, the laterally-expanding tray table nests within a depression in the mounting position, wherein the expanding tray table is adapted to fit flush within the at least one storage bay.

8. A laterally-expanding tray table for mounting on a seat back of an aircraft passenger seat, comprising:
   a telescoping table segment;
   a main table segment including an interior pocket for receiving the telescoping table segment, and at least two magnets disposed in the interior pocket to increase frictional engagement between the main table segment and the telescoping table segment;
   the telescoping table segment for being frictionally retained in the interior pocket in a retracted position, and for being frictionally maintained adjacent to the main table segment in a fully extended position to form a contiguous table surface including an upper surface of the telescoping table segment and an upper surface of the main table segment.

9. The laterally-expanding tray table of claim 8, wherein the main table segment comprises a thin flexible edge adapted to push debris away from the interior pocket upon retracting the telescoping table segment into the interior pocket.

10. The laterally-expanding tray table of claim 8, wherein the telescoping table segment includes a gripping edge extending from the main table segment when the telescoping table segment is in the retracted position.

11. The laterally-expanding tray table of claim 8, further comprising an arm assembly attached to the main table segment and including a pair of laterally opposing arms and a pivotally mounted cross bar, wherein the arm assembly permits the main table segment to pivot from a stowed position against the seat back to a horizontal in-use position.

12. The laterally-expanding tray table of claim 11, wherein the arm assembly further includes at least one table support extending perpendicular from the pivotally mounted cross bar, and further wherein the at least one table support permits the main table segment to slide away from the pivotally mounted cross bar to an extended position and to slide toward the pivotally mounted cross bar to a retracted position.

13. The laterally-expanding tray table of claim 12, wherein the first table segment envelops the at least one table support when the first table segment is in the retracted position.

14. The laterally-expanding tray table of claim 8, wherein the main table segment is configured to frictionally retain the telescoping table segment in a partially extended position when the telescoping table segment is partially within the interior pocket.

15. The laterally-expanding tray table of claim 1, wherein the main table segment comprises a thin flexible edge to push debris away from the interior pocket upon retracting the telescoping table segment into the interior pocket.

16. The laterally-expanding tray table of claim 15, wherein the arm assembly further includes at least one table support extending perpendicular from the pivotally mounted cross bar, and further wherein the at least one table support is adapted to permit the main table segment to slide away from the pivotally mounted cross bar to an extended position and to slide toward the pivotally mounted cross bar to a retracted position.

17. The laterally-expanding tray table of claim 16, wherein the first table segment envelops the at least one table support when the first table segment is in the retracted position.

18. The laterally-expanding tray table of claim 15, wherein the main table segment further comprises a portion of a latching mechanism, and further wherein a mated portion of the latching mechanism is mounted to the seat back of the passenger seat.

19. The laterally-expanding tray table of claim 18, wherein the portion of the latching mechanism comprises a release button for releasing the laterally-expanding tray table from the stowed position.

* * * * *